June 23, 1925.

W. EBERHARDT

SPRING TENSION REGULATOR

Filed June 23, 1920

Inventor
Walter Eberhardt
By Walter F. Murray
Attorney

Patented June 23, 1925.

1,543,560

UNITED STATES PATENT OFFICE.

WALTER EBERHARDT, OF CINCINNATI, OHIO, ASSIGNOR TO THE HERSCHEDE HALL CLOCK COMPANY, OF CINCINNATI, OHIO, A CORPORATION OF OHIO.

SPRING-TENSION REGULATOR.

Application filed June 23, 1920. Serial No. 391,204.

*To all whom it may concern:*

Be it known that I, WALTER EBERHARDT, a citizen of the United States of America, and resident of Cincinnati, in the county of Hamilton and State of Ohio, have invented a new and useful Improvement in Spring-Tension Regulators, of which the following is a specification.

An object of my invention is to provide a device to register the tension of springs, particularly springs used for clock hammers.

Another object is to provide a device for the purpose stated that is simple and accurate and that will readily permit modification of the spring tension.

These and other objects are attained by the means described herein and disclosed in the accompanying drawing in which.

Figure 1:
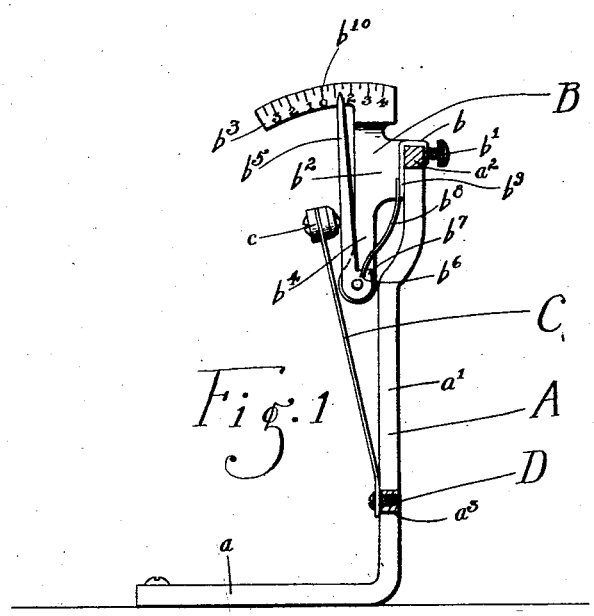
Fig. 1 is a side elevation of a mounting frame section with an indicator mounted thereon, both of which form details of my invention.
Figure 2:
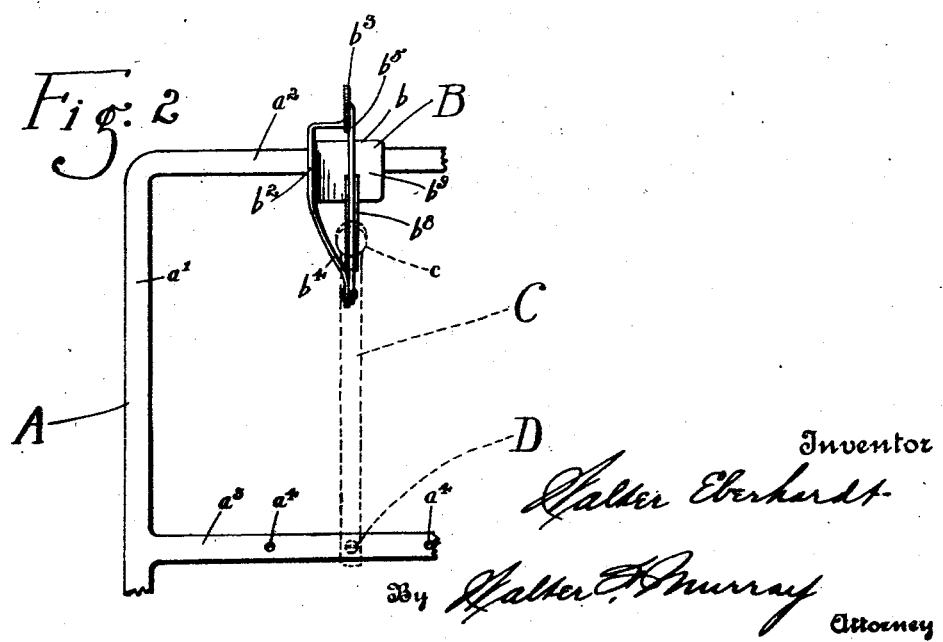
Fig. 2 is a front elevation of part of the device shown in Fig. 1.

My invention comprises the mounting frame A upon which a series of springs C can be temporarily mounted. A register or indicator device B mounted on the frame is adapted to be moved into engagement with the springs and to register the tension of the spring.

The frame A has a base $a$, the uprights $a'$ extending from the base, and the parallel upper cross bar $a^2$ and lower cross bar $a^3$. The lower cross bar has a series of threaded slots $a^4$ therethru, in which the screws D engage.

The indicator B comprises the bracket $b$ adapted to slidably engage the upper cross bar $a^2$ and being adapted to be secured upon the bar $a^2$ in various positions by the thumb screw $b'$.

The angle plate $b^2$ is formed integral with the bracket $b$, and has mounted upon it the indicator plate $b^3$ and the supporting arm $b^4$. The indicator arm $b^5$ is pivotally attached to the support arm $b^4$, and has a notch $b^6$ in its shoulder $b^7$. A spring $b^8$ is seated in the slot $b^6$ and is adapted to engage the apron $b^9$ formed on the angle plate and extending downward from the bracket $b$. The indicator arm $b^5$ is adapted to register upon the indicator plate $b^3$, and is adapted to be engaged by the hammer $c$ mounted upon the spring C when secured to the lower cross bar $a^3$ of the frame by means of screw D.

The operation of my device is as follows:

A spring C is mounted upon the lower cross bar $a^3$ by means of the screw D. The indicator B is mounted upon the upper cross bar $a^2$ and is moved into such alignment with the spring C so that the hammer $c$ will engage the indicator arm $b^5$, thereby pressing the spring $b^8$ against the apron $b^9$ and causing the indicator arm to register with one of the graduations $b^{10}$ upon the indicator plate $b^3$. A certain arbitrary graduation such as zero can be used as a standard. The spring C is bent forward or backward to cause the indicator arm to register with such standard. The frame A may be so arranged that a large number of springs C may be mounted thereon, making it possible to quickly and accurately adjust the tension of all the springs to the same degree by merely advancing the indicator from spring to spring and adjusting the springs so that they will all register the same degree of tension upon the indicator plate $b^3$. The springs are then removed from the frame and mounted in clocks. The springs are mounted upon $a^3$ in parallelism.

What I claim is:

1. In a device for measuring the tension of springs, the combination with a frame adapted to have a spring to be measured mounted thereon, of an indicator device comprising an indicator plate, an indicator arm adapted to register with the plate and to be engaged by said spring mounted on the frame, and means adapted to yieldingly resist pressure upon the indicator arm.

2. In a device for measuring the tension of springs the combination with a frame adapted to have a spring mounted thereon, of an indicator device mounted on the frame and comprising an apron, an indicator plate, a support arm, an indicator arm adapted to engage a mounted spring and to register with the indicator plate, a pivot connecting the indicator arm to the support arm, and means adapted to yieldingly resist pressure upon the indicator arm.

3. In a device for measuring the tension of springs the combination with a frame adapted to have a spring mounted thereon, of an indicator device mounted on the frame and comprising an apron, an indicator plate, a support arm, an indicator arm adapted to engage a mounted spring and to register with the indicator plate, a pivot connecting the indicator arm to the support arm, and a spring mounted on the indicator arm adapted to yieldingly engage the apron.

4. In a device for measuring the tension of springs, the combination with a frame adapted to have a series of springs mounted thereon, of an indicator device slidably mounted upon the frame and adapted to be moved into individual engagement with any such mounted spring and to assume the same relative position to the parts of similar springs when in engagement therewith.

5. In a device for measuring the tension of springs, the combination with a frame comprising parallel cross bars, one of which is adapted to have a series of springs mounted thereon in parallelism, and a second bar being adapted to support an indicator device, of an indicator device adapted to be mounted upon the second bar and to be reciprocated thereon and to engage the springs individually.

6. In a device for measuring the tension of springs the combination with a frame adapted to have a series of springs mounted thereon, of an indicator device comprising a bracket adapted to slidably engage the frame, means to secure the bracket to the frame in various positions, an apron on the bracket, an indicator plate attached to the bracket, an indicator arm adapted to register with the indicator plate and to engage springs mounted on the frame, a pivot connecting the indicator arm to the bracket, and a spring mounted on the indicator arm adapted to yieldingly engage the apron.

7. In a device of the class set forth, a support and means for detachably attaching thereto a plurality of flat springs spaced apart with their attached ends in alinement, another support arranged parallel to the aforesaid support, and a tension-registering device adapted to be moved along on this latter support to bring it into engagement with the free end of any one of said springs and hold the same flexed to thereby indicate the tension thereof.

8. In a device of the class set forth, a support and means for detachably attaching thereto a plurality of flat springs spaced apart with their attached ends in alinement, another support arranged parallel to the aforesaid support, and a tension-registering device adapted to be moved along on this latter support to bring it into engagement with the free end of any one of said springs and hold the same flexed to thereby indicate the tension thereof, said tension-registering device embodying a scale-plate and a spring-actuated pointer working thereover and positioned to be actuated by any one of said springs.

9. In a device for measuring the tension of springs, the combination of a frame comprising a pair of spaced arms, a tension indicating device slidably engaging one of said arms, means for mounting a flat spring, the tension of which is to be measured, on the other cross arm and engaging the indicating device, and means yieldingly resisting pressure on the indicating device.

In witness whereof, I have hereunto subscribed my name this 22nd day of June, 1920.

WALTER EBERHARDT.